United States Patent
Kim et al.

(12) 
(10) Patent No.: US 7,656,675 B2
(45) Date of Patent: *Feb. 2, 2010

(54) MOBILE TERMINAL

(75) Inventors: Jong-Hun Kim, Seoul (KR); Min-Ho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/350,891

(22) Filed: Jan. 8, 2009

(65) Prior Publication Data

US 2009/0116202 A1 May 7, 2009

Related U.S. Application Data

(63) Continuation of application No. 11/777,131, filed on Jul. 12, 2007, now Pat. No. 7,492,602.

(30) Foreign Application Priority Data

Jul. 14, 2006 (KR) ............... 10-2006-0066575
Jul. 27, 2006 (KR) ............... 10-2006-0071042

(51) Int. Cl.
*H05K 5/00* (2006.01)
(52) U.S. Cl. ............... 361/752; 361/730; 174/520; 455/575.1; 455/90.3; 345/173
(58) Field of Classification Search ............... 361/752, 361/730; 455/550.1, 575.1, 556.1, 90.3, 455/347; 174/50, 520; 345/173, 156
See application file for complete search history.

(56) References Cited

U.S. PATENT DOCUMENTS

| 5,749,457 | A | * | 5/1998 | Castaneda et al. ........... 200/343 |
| 6,128,515 | A | * | 10/2000 | Kabler et al. ............... 455/566 |
| 6,148,183 | A | * | 11/2000 | Higdon et al. ........... 455/575.1 |
| 6,747,224 | B1 | | 6/2004 | Jenks et al. |
| 6,760,074 | B1 | | 7/2004 | Maruyama et al. |
| 6,914,773 | B2 | * | 7/2005 | Yang et al. ............. 361/679.02 |
| 7,492,602 | B2 | * | 2/2009 | Kim et al. ................... 361/752 |
| 2004/0042160 | A1 | | 3/2004 | Yang et al. |
| 2004/0046739 | A1 | * | 3/2004 | Gettemy ..................... 345/158 |

FOREIGN PATENT DOCUMENTS

| EP | 1 471 716 A2 | 10/2004 |
| EP | 1 544 714 A2 | 6/2005 |
| EP | 1 603 308 A1 | 12/2005 |
| GB | 2 330 980 A | 5/1999 |

* cited by examiner

*Primary Examiner*—Dameon E Levi
(74) *Attorney, Agent, or Firm*—Birch, Stewart, Kolasch & Birch, LLP

(57) ABSTRACT

A mobile terminal includes a frame having a front side and a rear side, the rear side having a first receiving space and a second receiving space located beside one another, a front cover disposed to at least partially cover the front side of the frame, the front cover having a transparent portion, a touch screen located between the front cover and the frame, the touch screen permitting transmission of a signal when the transparent portion is contacted, a camera located in one of the first and second receiving spaces, and a rear cover disposed to at least partially cover each of the first and second receiving spaces.

16 Claims, 9 Drawing Sheets

MOBILE TERMINAL

CROSS REFERENCE TO RELATED APPLICATIONS

This application is a Continuation of co-pending application Ser. No. 11/777,131, filed on Jul. 12, 2007 which claims the benefit to Korean Patent Application Nos. 10-2006-0066575, filed on Jul. 14, 2006, and 10-2006-0071042, filed on Jul. 27, 2006, which are expressly incorporated by reference in their entireties.

BACKGROUND OF THE INVENTION

1. Field of the Invention

The present invention relates to a mobile terminal and, more particularly, to a mobile terminal that is thin.

2. Description of Related Art

In general, a mobile terminal includes a display unit having a display to display information and a terminal body that is connected to the display unit by a hinge connection unit. The terminal body has a keypad that is mounted on its front surface and inputs information and a battery that is mounted on its rear surface. A speaker that generates a sound is mounted at one end of the display unit and a microphone that inputs a sound is mounted at one end of the terminal body.

In the related art mobile terminal, when the display unit is rotated centering around the hinge connection unit and opened, the display and the keypad are exposed to allow the terminal to be used in a communication mode to transmit and receive data.

However, the related art mobile terminal has the following problem. That is, because the two bodies are connected to allow opening and closing thereof, the overall thickness of the terminal is undesirably large, and thus a larger sized display cannot be implemented due to limitations in size expansion.

BRIEF SUMMARY OF THE INVENTION

Therefore, in order to address the above matters the various features described herein have been conceived. One aspect of the exemplary embodiments is to provide a mobile terminal which is thin and appealing aesthetical design by forming front and rear covers on both sides of a frame positioned at a middle portion of the mobile terminal.

According to principles of this invention, a mobile terminal is provided that includes a frame having a front side and a rear side, the rear side having a first receiving space and a second receiving space located beside one another, a front cover disposed to at least partially cover the front side of the frame, the front cover having a transparent portion, a touch screen located between the front cover and the frame, the touch screen permitting transmission of a signal when the transparent portion is contacted, a camera located in one of the first and second receiving spaces, and a rear cover disposed to at least partially cover each of the first and second receiving spaces.

In another aspect, the transparent portion may be a display window. In addition, a display may be mounted in a space between the front cover and the front side of the frame, the display being visible through the display window.

In another aspect, at least one circuitry supporting substrate is located in the first receiving space. In addition, a battery may be located in the second receiving space.

In still another aspect, a speaker hole is located at an upper portion of the front cover.

In a different aspect, a keypad mounting part is located in the front cover.

In yet another aspect, the front cover is fastened by fasteners to the frame in a direction from the frame towards the front cover to prevent the fasteners from being exposed.

In another aspect, the frame includes a support unit having an outer surface that is exposed, the support unit defining the edge of the frame, and a partitioning plate that divides the frame into the front side and the rear side. In addition, a display may be located on the front side of the frame, a circuitry supporting substrate may be located in the first receiving space, and the partitioning plate includes a through hole to allow a connector to connect the display to the circuitry supporting substrate through the partitioning plate.

In a further aspect, the first and second receiving spaces are disposed horizontal to the rear side of the frame.

In still another aspect, the rear cover covers the first receiving space and a battery cover is detachably mounted to cover the second receiving space.

In a different aspect, a camera window is located in the rear cover.

In still another aspect, the rear cover includes a plurality of hooks at one end and a plurality of fastening holes at the other end, the one end of the rear cover is fastened to the frame in a hooking manner and the other end thereof is fastened to the frame via fasteners passing through the fastening holes. In addition, the battery cover may cover the fastening holes of the rear cover.

In yet another aspect, at least one keypad for inputting information is mounted on at least one of the four sides of the frame, and at least one keypad is mounted on the front side of the frame. In addition, the at least one keypad for inputting information mounted on at least one of the four sides of the frame may include first and second keypads, each of the first and second keypads being located at opposite sides of the frame, and the at least one keypad mounted on the front side of the frame may be a third keypad located at an edge portion of the front surface of the frame. The keypads may be push type keypads that input signals according to a pressing operation.

In still a further aspect, a microphone may be mounted at the third keypad and the microphone and the third keypad are electrically connected.

In another aspect, the first and third keypads may be connected by a flexible circuitry supporting substrate, and the first keypad includes a first connector electrically connectable to a circuitry supporting substrate. In addition, the second keypad includes a second connector electrically connectable to a circuitry supporting substrate.

In accordance with principles of this invention, a mobile terminal is provided that includes a body having a front side and a rear side, at least a majority of the front side being a transparent portion, an outer surface of the front side including the transparent portion being substantially flat, a display located in the body and visible through the transparent portion of the front side of the body, a touch screen located between the transparent portion and the display, and a camera located at the rear side of the body.

In another aspect, at least one key may be arranged on a side of the body for inputting information.

In still another aspect, a speaker hole may be located at the front side.

In another aspect, a microphone may be located in the body.

In yet another aspect, the terminal can transmit and/or receive data.

Further aspects of the mobile terminal are similar to those detailed above.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A slide type mobile terminal according to an exemplary embodiment of the present invention will now be described in detail with reference to the accompanying drawings.

Figure 1:
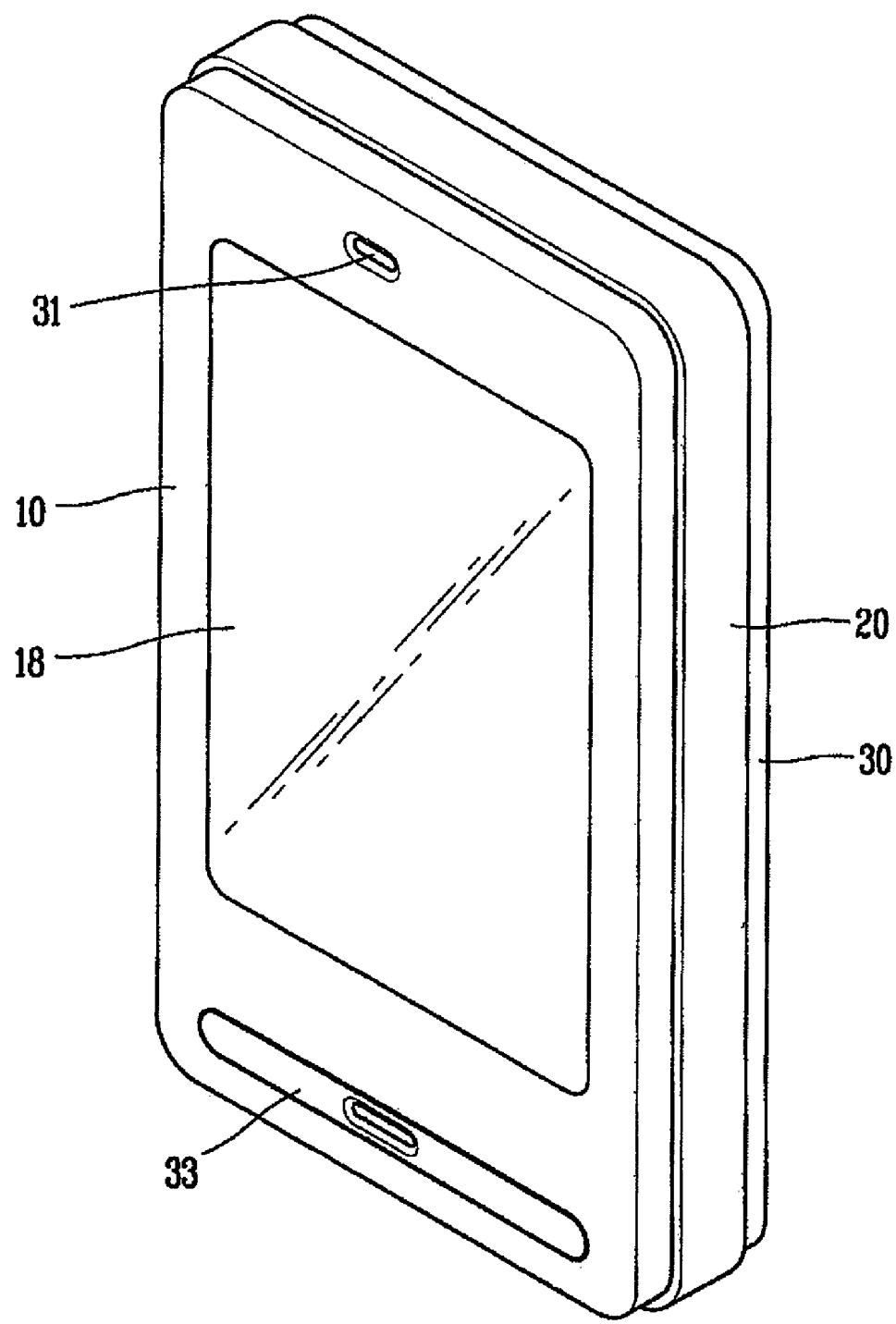
FIG. 1 is a front perspective view of a mobile terminal according to an exemplary embodiment of the present invention.
Figure 2:
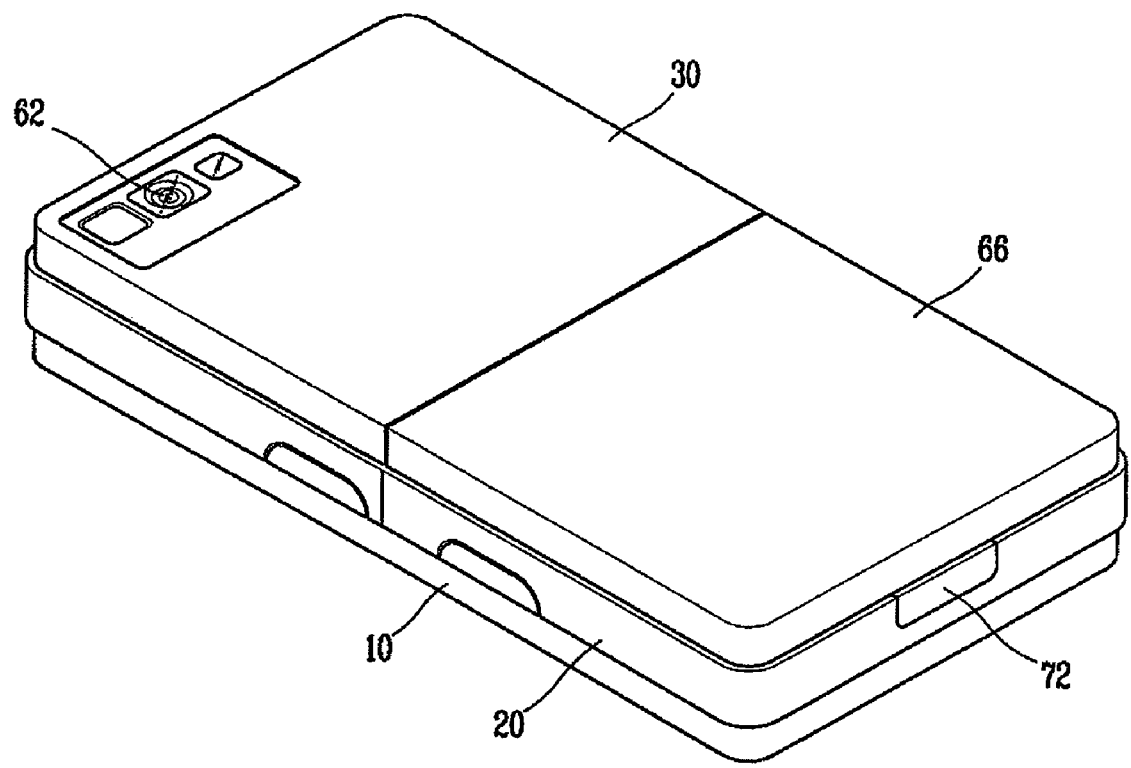
FIG. 2 is a rear perspective view of the mobile terminal according to the exemplary embodiment of the present invention.
Figure 3:
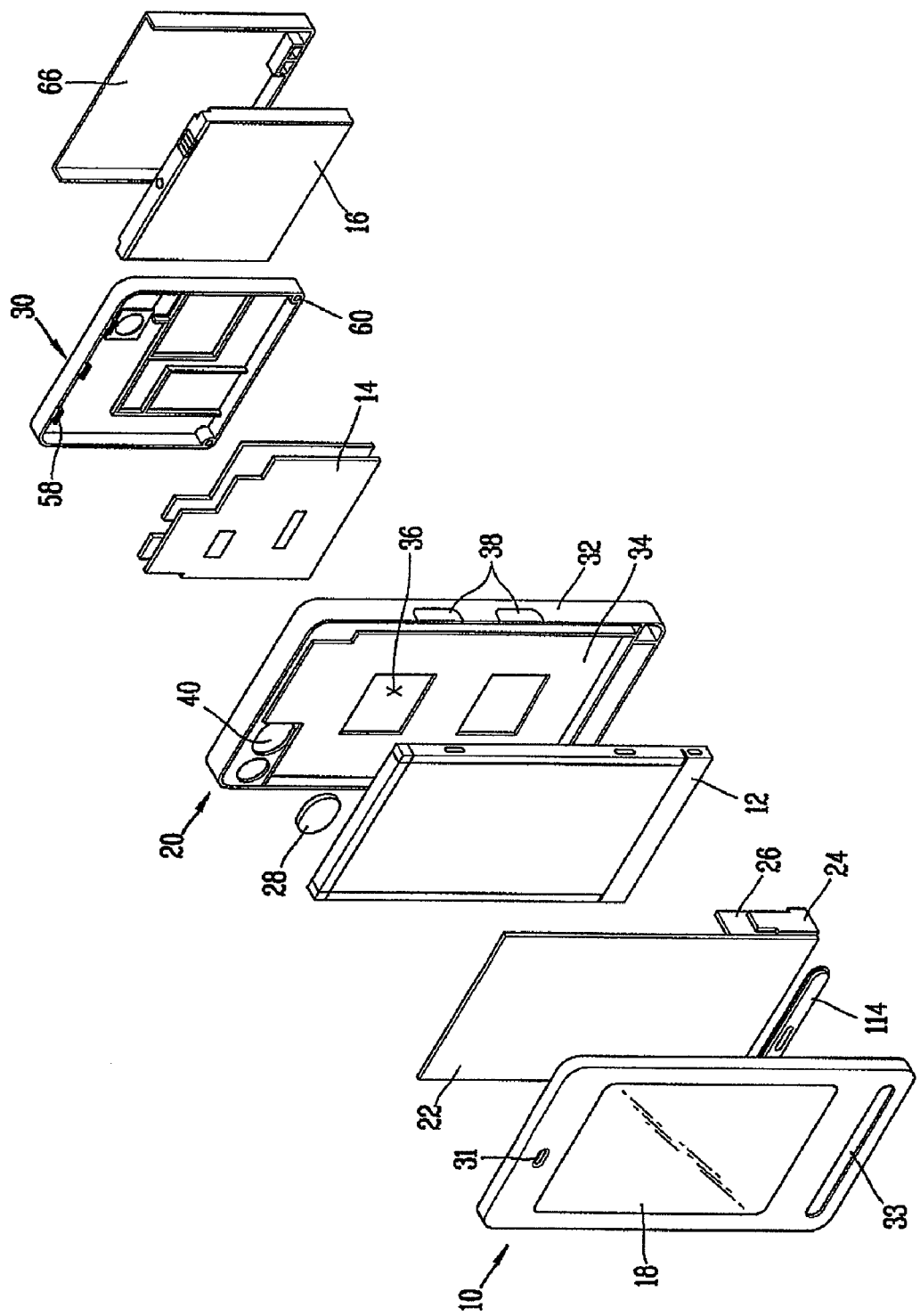
FIG. 3 is an exploded perspective view of the mobile terminal according to the exemplary embodiment of the present invention.
Figure 4:
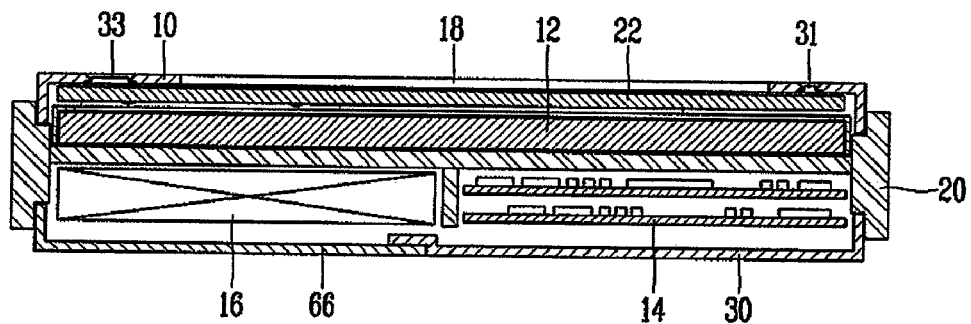
FIG. 4 is a sectional view of the mobile terminal according to the exemplary embodiment of the present invention.

FIG. 1 is a front perspective view of a mobile terminal according to an exemplary embodiment of the present invention, FIG. 2 is a rear perspective view of the mobile terminal according to the exemplary embodiment of the present invention, FIG. 3 is an exploded perspective view of the mobile terminal according to the exemplary embodiment of the present invention, and FIG. 4 is a sectional view of the mobile terminal according to the exemplary embodiment of the present invention.

The mobile terminal according to the exemplary embodiment of the present invention includes a frame 20 with an external circumferential surface being exposed and supporting the entire mobile terminal, a front cover 10 fastened on a front surface of the frame 20, and a rear cover 30 fastened on a rear surface of the frame 20. A display 12 is mounted in a space between the front cover 10 and the frame 20. At least one circuitry supporting substrate 14 is mounted in a space between the frame 20 and the rear cover 30 along with a battery 16.

The front cover 10 is at least partially transparent to define a display window 18 allowing information displayed on the display 12 to be seen, and a transparent touch screen 22 is attached on a rear surface of the front cover 10 to allow information to be inputted in a touch manner.

A substrate 26 having a driving circuit 24 attached at one end thereof is connected with the touch screen 22, and the substrate 26 is connected with the circuitry supporting substrate 14 by a flexible circuitry supporting substrate (not shown).

A speaker hole 31 for emanating sound generated from the speaker 28 is formed at an upper end of the front cover 10, and a keypad mounting hole 33 is formed at a lower end of the front cover 10. A keypad 114 that inputs information is mounted at a lower end of the front cover 10 and is accessible through the keypad mounting hole 33. Preferably, at least one or more keypads are mounted on the front surface of the front cover 10.

Figure 5:
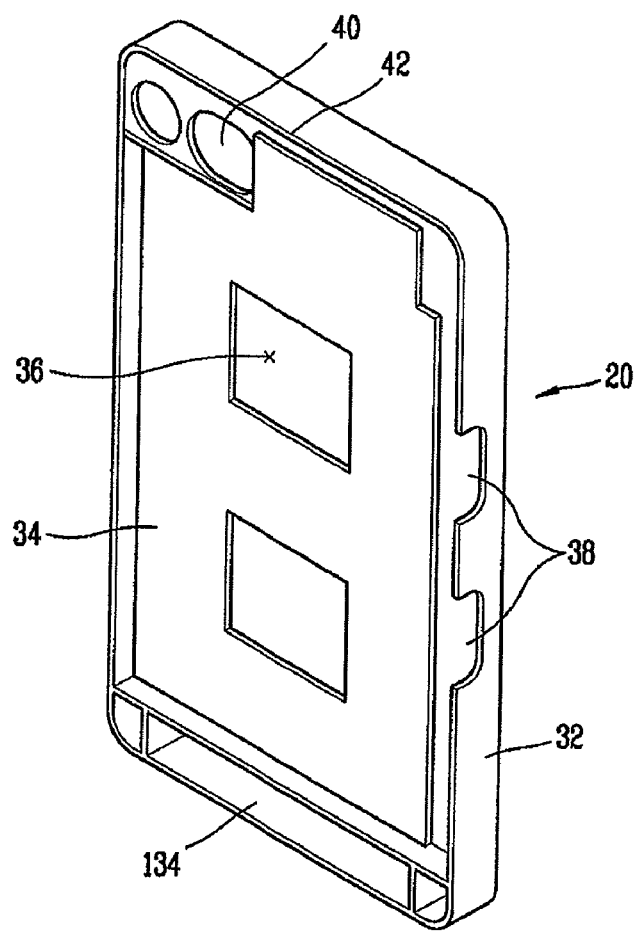
FIGS. 5 and 6 are perspective views of a frame of the mobile terminal according to the exemplary embodiment of the present invention.
Figure 6:
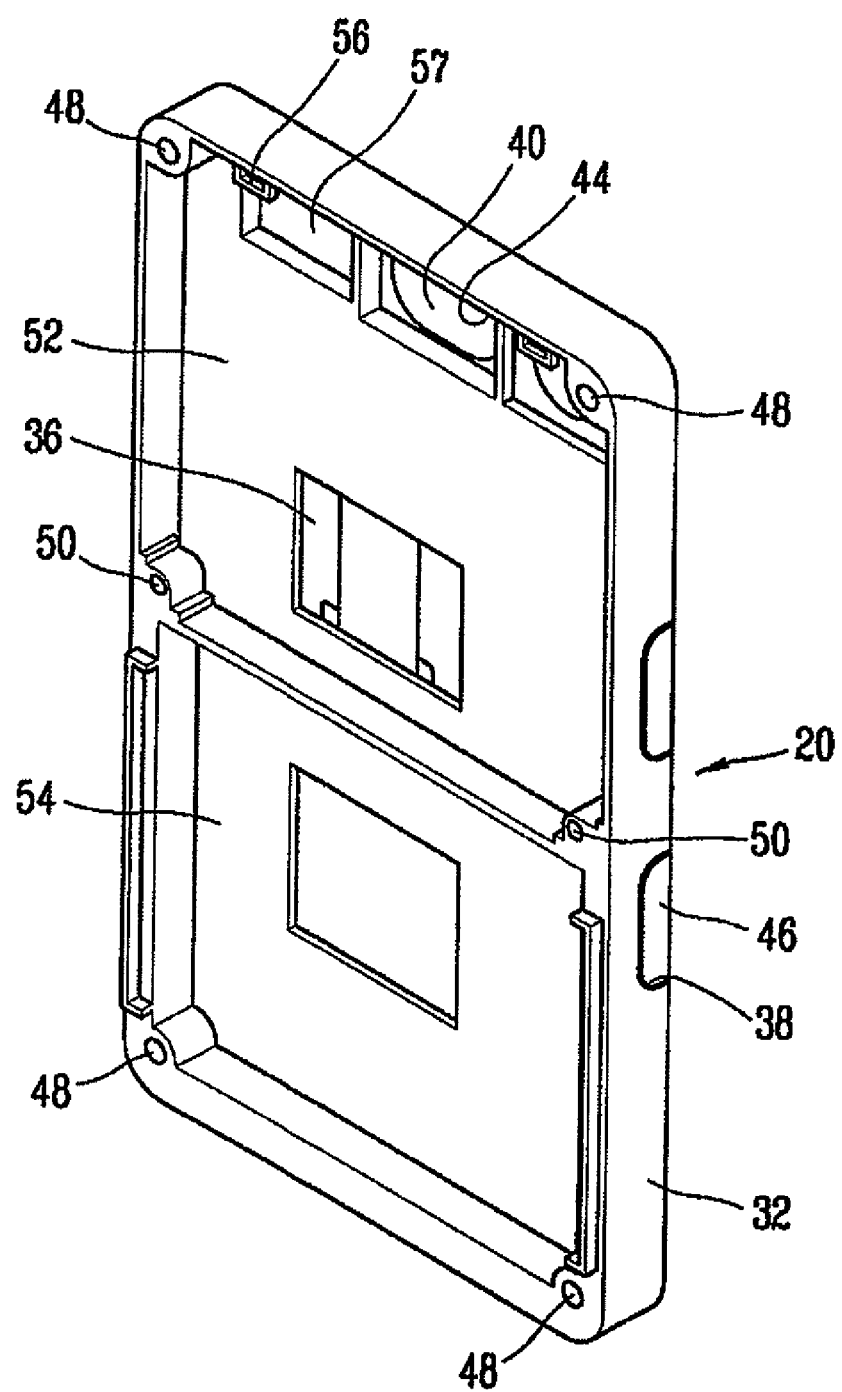
Figure 7:
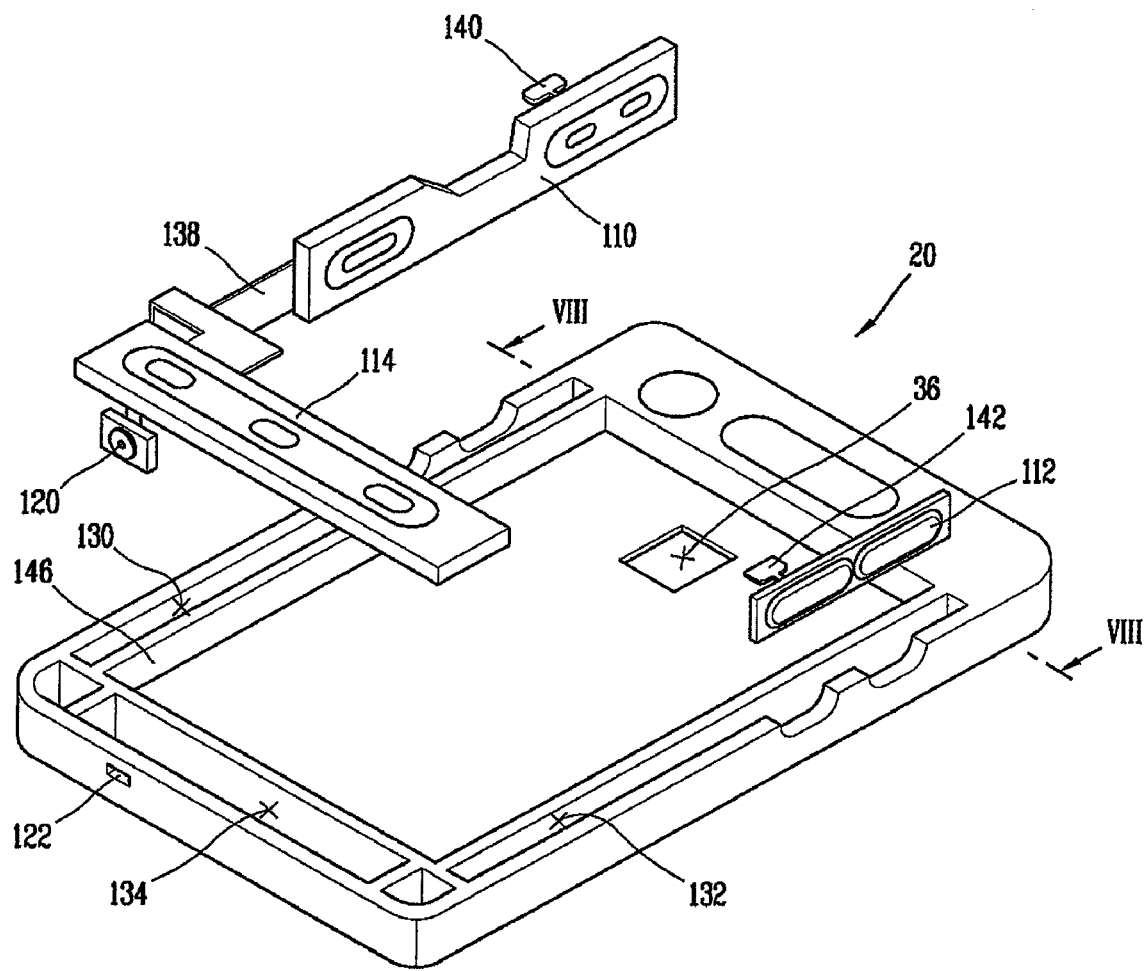
FIG. 7 is an exploded perspective view showing a mounting structure of a keypad of the frame according to the exemplary embodiment of the present invention.

FIGS. 5 and 6 are perspective views of a frame of the mobile terminal according to the exemplary embodiment of the present invention, and FIG. 7 is an exploded perspective view showing a mounting structure of a keypad of the frame according to the exemplary embodiment of the present invention.

The frame 20 has certain rigidity to maintain overall rigidity of the terminal. The frame 20 includes a support 32 that has a certain height and is formed in a rectangular shape in a circumferential direction at an edge portion and has an outer surface being exposed, and a partitioning plate 34 formed within the support 32 and partitioning front and rear sides of the frame 32.

A through hole 36 is formed on the partitioning plate 34 to allow a connector, which electrically connects the display 12 mounted on the front surface of the partitioning plate 34 and the circuitry supporting substrate 14 mounted on the rear surface of the partitioning plate 34, to pass therethrough. Keypad mounting holes 38 are provided in the support 32 to allow access to keypads located therein.

A camera mounting part 57 on which a camera 61 is mounted is formed at one side of the partitioning plate 34. A speaker mounting part 40 on which the speaker 28 is mounted is formed at the side of the camera mounting part 57.

A first mounting face 42 on which the edge portion of the front cover 10 is mounted is formed at a front edge portion of the frame 20, and a second mounting face 44 on which the edge portion of the rear cover 30 is mounted is formed at a rear edge portion of the frame 20.

Fastening holes 48 are penetratingly formed at four corner portions of the frame 20, through which fasteners pass to be fastened with the front cover 10.

The fastening structure of the frame 20 and the front cover 10 will now be described in detail. The front cover 10 is mounted on the first mounting face 42 formed on the front surface of the frame 20, and then the fasteners are allowed to pass through the fastening holes in the direction of the front cover 10 from the rear surface of the frame 20 so as to be fastened in the fastening holes formed at the four corner portions of the inner surface of the front cover 10. Because the fasteners pass through a first fastening hole 48 from the rear side to the front side of the frame 20 so as to be fastened with the front cover 20, the front surface of the front cover 10 can have a fine design without a fastener hole for fastening the fasteners.

Fastening holes 50 are formed at both sides of a middle portion of the frame 20 for fastening the frame 20 with the rear cover 30.

On the rear surface of the frame 20, there are formed a substrate mounting part 52 on which the circuitry supporting substrate 14 is mounted and a battery mounting part 54 on which the battery 16 is mounted. A partition 53 separates the substrate mounting part 52 and the battery mounting part 54 into first and second receiving spaces. The camera mounting part is formed in one of the receiving spaces, preferably the first receiving space.

First and second keypads 110, 112 are mounted on at least one of the four sides of the frame 20, and at least one or more keypads, such as a third keypad 114 is mounted on the front side of the frame 20, and keypad mounting parts 130, 132 and 134 in which the keypads are mounted are formed at the frame 20. The first and second keypads 110 and 112 are side keypads that are mounted at the side of the frame 20 and input information similar to the third keypad 114. The keypads may provide many different functions including activating/deactivating the touch screen 22 to prevent inadvertent command entry via the touch screen 22.

In the exemplary embodiment shown, the first and second keypads 110, 114 are electrically connected by the flexible circuitry supporting substrate 138. A first connector 140 is mounted at the first keypad 110 and the first connector 140 is electrically connected with the circuitry supporting substrate 14. Accordingly, the first and third keypads 110 and 114 can be electrically connected with the circuitry supporting substrate 14 by the single connector 140.

A microphone 120 for generating a sound is mounted at the side of the third keypad 114. Because the microphone 120 is electrically connected with the third keypad 114, the microphone 120 is electrically connected with the circuitry supporting substrate 14 by means of the first connector 140 so that the microphone 120 generates a sound according to an electrical signal applied from the circuitry supporting substrate 14.

A microphone mounting part 122 in which the microphone 120 is mounted is formed at the frame 20.

The second keypad 112 is a side keypad mounted at the side of the frame 20. The second keypad 113 has a second connector 142 mounted at one side thereof and is electrically connected with the circuitry supporting substrate 14.

In the exemplary embodiment shown, the first keypad mounting part 130, on which the first keypad 110 is mounted, is formed at one side of the frame 20, the second keypad mounting part 132, on which the second keypad 112 is mounted, is formed at the other side of the frame 20, and a third keypad mounting part 134, on which the third keypad 114 is mounted, is formed at an edge portion of the front surface of the frame 20.

Figure 8:
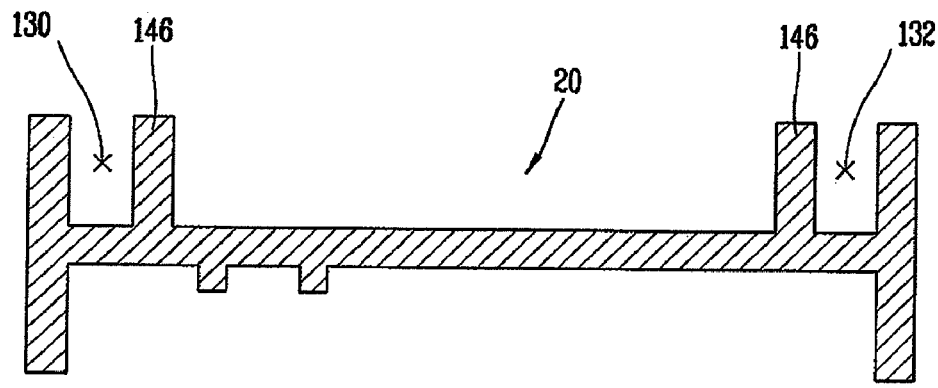
FIG. 8 is a sectional view taken along line VIII-VIII in FIG. 7.

Herein, as shown in FIG. 8, the first and second keypad mounting parts 130 and 132 are formed in a certain space form by support ribs 146 vertically protruded at left and right edge portions of the frame 20, in which the first and second keypads 110 and 120 are mounted.

Figure 9:
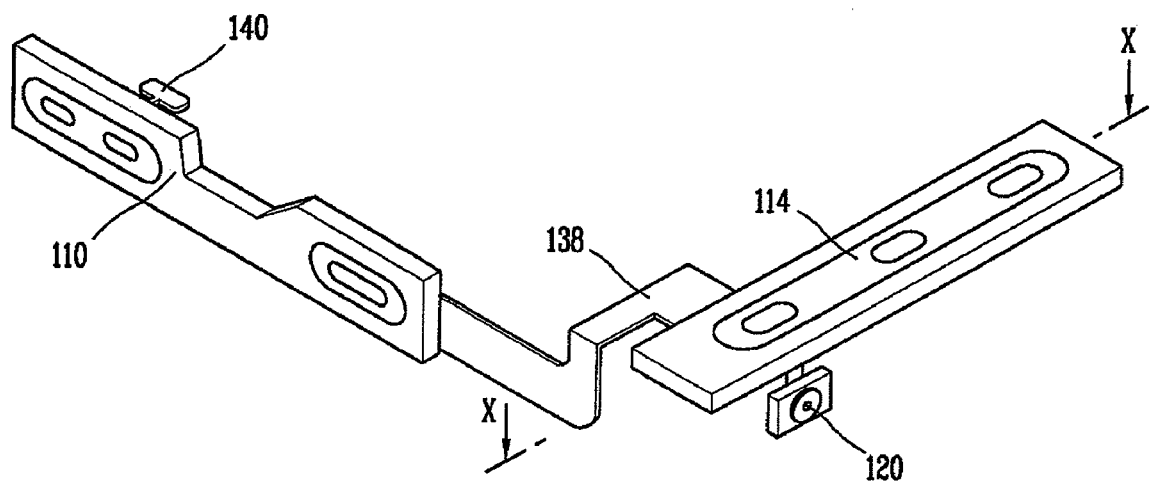
FIG. 9 is a perspective view of a keypad according to the exemplary embodiment of the present invention.
Figure 10:
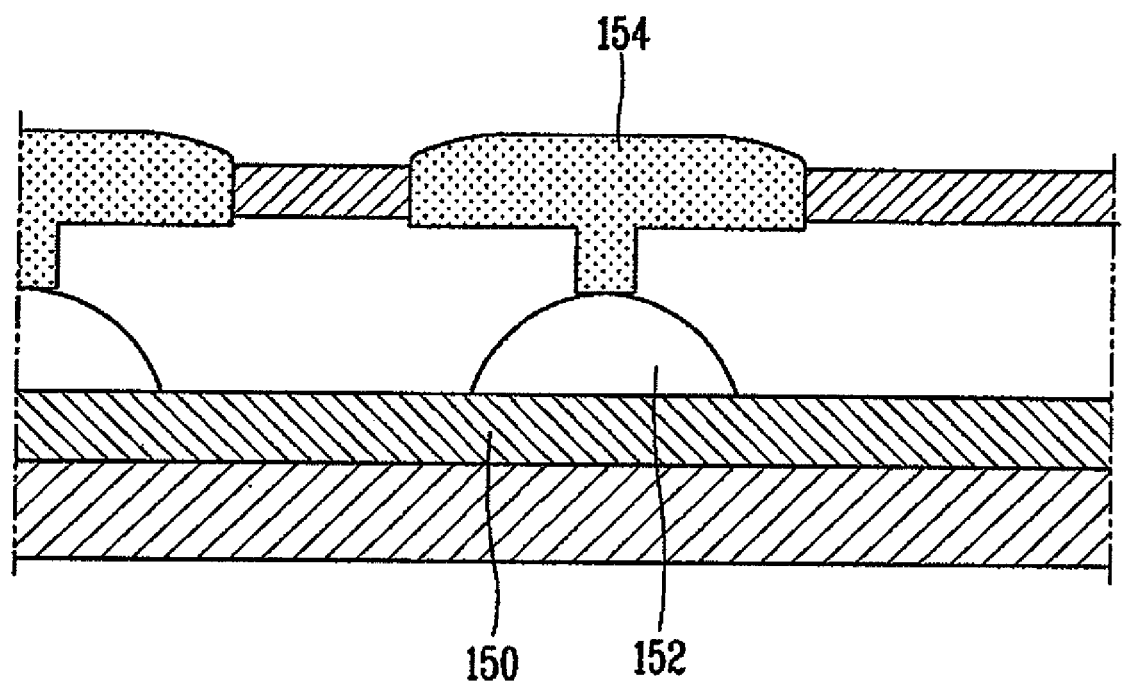
FIG. 10 is a sectional vie taken along line X-X in FIG. 9.

The above-described first, second and third keypads 110, 112, and 114 are push type keypads, and, as shown in FIGS. 9 and 10, they include a keypad circuitry supporting substrate 150 fixed on the keypad mounting part, a dome switch 152 mounted on an upper surface of the keypad circuitry supporting substrate 150 for inputting a signal by a pressing operation, and a key button 154 mounted on an upper surface of the dome switch 152 and exposed so that when a user presses it, it pushes the dome switch 152.

Figure 11:
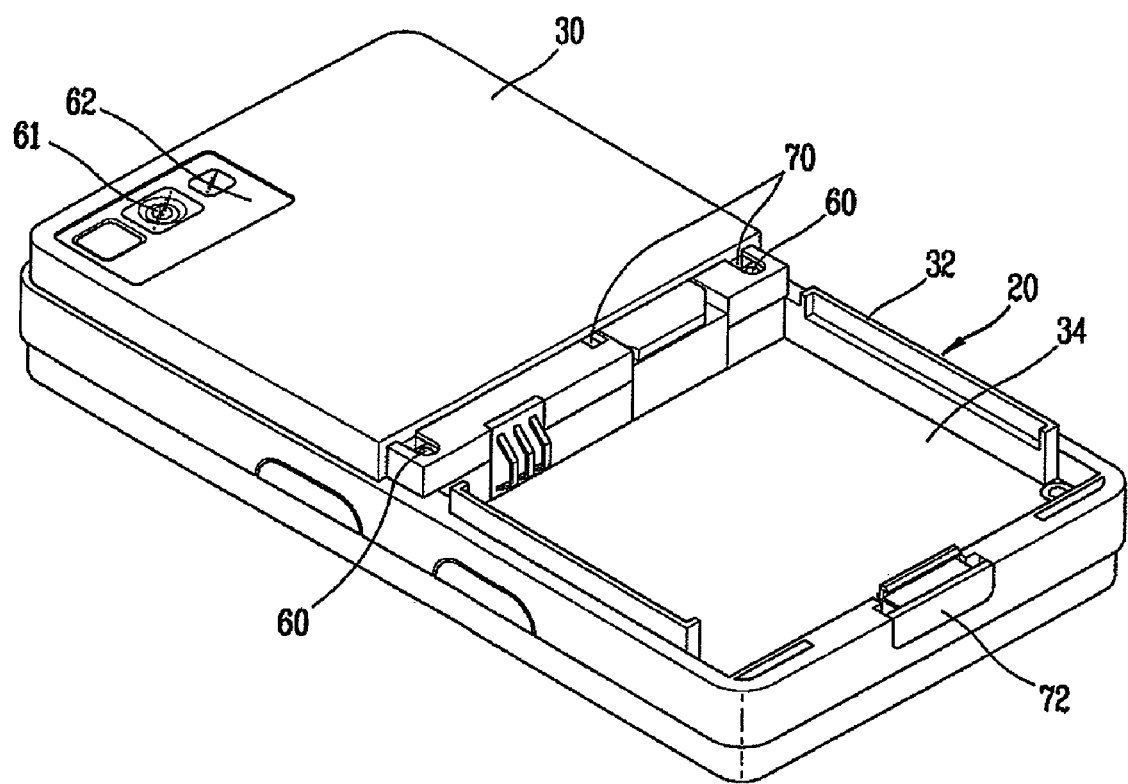
FIG. 11 is a perspective view of the mobile terminal without a battery cover according to the exemplary embodiment of the present invention.

FIG. 11 is a perspective view of the mobile terminal without a battery cover according to the exemplary embodiment of the present invention.

The rear cover 30 is fastened on the substrate mounting part 52 of the frame 20. One end of the rear cover 30 is hooked at one end of the frame 20 and the other end thereof is fastener-fastened at the frame 20. Namely, hooking protrusions 56 (FIG. 6) are formed to be protruded in an inward direction at an edge portion of the rear surface of the frame 20, and the fastener fasting holes 50 are formed at both sides of the middle portion of the rear surface of the frame 20. Hooks 58 (FIG. 3) to engage the hooking protrusions 56 are formed at one end of the rear cover 30, and fastening holes 60 are formed at the other end of the rear cover 30 and communicate with the fastening holes 50 so as to be fastened.

A camera window 62 is formed on the rear cover 30 and allows a camera lens of the camera 61 to be exposed.

An assembling process of the rear cover 30 will now be described. First, the hooks 58 formed at one end of the rear cover 30 are inserted to engage the hooking protrusions 56 of the frame 20. Thereafter, the fasteners are fastened in the fastening holes 60 formed at the rear cover 30 to make the rear cover 30 fastened to the frame 20.

A battery cover 66 (FIG. 3) for protecting the battery is combined on the battery mounting part 54 of the frame 20. Hooks (not shown for clarity) formed at one end of the battery cover 66 are inserted in recesses 70 formed at a middle portion of the frame 20, and the other end of the battery cover 66 is locked by a battery cover locking unit 72 mounted at one end of the frame 20.

The battery cover 66 covers the fastener fasting holes 60 so that the mobile terminal can have an appealing aesthetical design without such holes for fastening.

The assembling process of the mobile terminal according to the present invention will now be described.

The display 12 is mounted on the front surface of the frame 20, the circuitry supporting substrate 14 is mounted on the board mounting part 52 of the rear surface of the frame 20, and the battery 16 is mounted on the battery mounting part 54 of the rear surface of the frame 20. The display 12 and the circuitry supporting substrate 14 are connected by the connector.

The transparent touch screen 22 is attached on the inner surface of the front cover 10. The first and second keypads 110 and 112 are mounted on the first and second keypad mounting parts 130 and 132 formed at the side of the frame 20, and the third keypad 114 is mounted on the third keypad mounting part 134 formed at the front surface of the frame 20. And then, the first connector 140 mounted at the first keypad 110 and the second connector 142 mounted at the second keypad 112 are connected with the circuitry supporting substrate 14.

Thereafter, the front cover 10 is mounted on the front surface of the frame 20. Namely, after the front cover 10 is mounted on the front surface of the frame 20, the fasteners are inserted into the fastening holes 48 of the frame 20 from the rear side to the front side, so as to be fastened with the front cover 10. Accordingly, because the fastening holes are not exposed from the outer surface of the front cover 10, the terminal can have the appealing aesthetical design.

The rear cover 30 is combined on the rear surface of the frame 20. Specifically, the hooks 58 of the rear cover 30 are hooked to the hooking protrusions 56 formed at one end of the frame 20, and then, the fasteners are allowed to pass through the fastening holes 60 of the rear cover 30 so as to be fastened with the fastening holes 50 of the frame 20.

The battery cover 66 is mounted on the rear surface of the frame 20. Namely, the hooks formed at one end of the battery cover 66 are inserted into the recesses 70 formed at the frame 20, and then, the other end of the battery cover 66 is locked by the battery cover locking unit 72 mounted at one side of the frame 20. Then, because the battery cover 66 covers the fastening holes 60 of the rear cover 30, the fastening holes are not exposed from the rear surface of the terminal, contributing to make the mobile terminal have the fine and neat design.

As so far described, the mobile terminal according to the present invention has the following advantages.

That is, because the front cover is combined on the front surface of the frame with its outer surface being exposed, the rear cover is combined on the rear surface of the frame, the display is mounted between the frame and the front cover, and the circuitry supporting substrate is mounted between the frame and the rear cover, the terminal can become thin and have the appealing aesthetical design.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal case partitioned into a first space and a second space, the second space having an upper portion and a lower portion disposed in a length direction;
   first and second PCBs (Printed Circuit Boards) mounted in the upper portion, wherein the first and second PCBs are mounted to be partially overlapping each other;
   a battery disposed to face the first and second PCBs and mounted in the lower portion;
   keypads electrically connected to at least one of the first and second PCBs and mounted on at least two of four sides of the terminal case;
   a touch screen installed to a front surface of the terminal;
   a display module mounted in the first space and, located over the battery and the first and second PCBs and located under the touch screen and configured to display information; and
   front and rear covers enclosing the terminal case,
   wherein the keypads include a first keypad and a second keypad connected to at least one of the first and second PCBs,
   wherein the terminal case is disposed between the front and rear covers and between the display module and the battery and first and second PCBs and includes a through hole to electrically connect the display module to at least one of the first and second PCBs, and
   wherein the first and second keypads are mounted on first and second sides of the terminal case, respectively, and a third keypad is mounted on the front surface of the terminal case and electrically connected to the first keypad.

2. The terminal of claim 1, wherein the first space is formed on a front surface of the terminal case, and the second space is formed on a rear surface of the terminal case.

3. The terminal of claim 1, wherein the terminal case comprises:
   a supporting portion having an outer surface that is exposed, the supporting portion defining an edge of the terminal case; and
   a partitioning plate that divides the supporting portion into a front side and a rear side.

4. The terminal of claim 3, wherein the through hole is formed on the partitioning plate to allow a connector to connect the display module to at least one of the first and second PCBs.

5. The terminal of claim 1, wherein the upper portion and the lower portion of the second space are disposed horizontal to a rear side of the terminal case, and are located beside one another.

6. The terminal of claim 1, wherein a region of the front cover is at least partially transparent and the display module is visible through the region.

7. The terminal of claim 1, wherein the keypads are push type keypads that input signals according to a pressing operation.

8. The terminal of claim 1, wherein the first keypad includes a first connector, the second keypad includes a second connector, and the terminal case includes through holes to electrically connect the first and second connectors to at least one of the first and second PCBs mounted at a rear side of the terminal case.

9. The terminal of claim 1, further comprising a microphone mounted at the third keypad, the microphone electrically connected to the third keypad.

10. The terminal of claim 1, wherein the first and third keypads are connected to each other by a FPC (Flexible Printed Circuit).

11. The terminal of claim 1, wherein the display module is located over an entire of the battery and the first and second PCBs.

12. A mobile terminal comprising:
    a terminal case having a front space and a rear space, the rear space having a first space and a second space disposed in a length direction;
    first and second PCBs (Printed Circuit Boards) mounted in the first space, wherein the first and second PCBs are mounted to be partially overlapping each other;
    a battery disposed to face the first and second PCBs and mounted in the second space;
    keypads electrically connected to at least one of the first and second PCBs and mounted on at least two of four sides of the terminal case;
    a touch screen installed to a front surface of the terminal;
    a display module mounted in the front space, and located over the battery and the first and second PCBs and located under the touch screen and configured to display information; and
    front and rear covers enclosing the terminal case,
    wherein the keypads include a first keypad and a second keypad connected to at least one of the first and second PCBs,
    wherein the terminal case is disposed between the front and rear covers and between the display module and the battery and first and second PCBs and includes through holes to electrically connect the display module to at least one of the first and second PCBs, and
    wherein the first and second keypads are mounted on first and second sides of the terminal case, respectively, and a third keypad is mounted on the front surface of the terminal case and electrically connected to the first keypad.

13. The terminal of claim 12, wherein the terminal case comprises:

a supporting portion having an outer surface that is exposed, the supporting portion defining an edge of the terminal case; and a partitioning plate that divides the supporting portion into a front side and a rear side.

14. The terminal of claim 13, wherein the through holes are formed on the partitioning plate to allow a connector to connect the display module to at least one of the first and second PCBs.

15. The terminal of claim 12, wherein the first space and the second space are disposed horizontal to a rear side of the terminal case, and are located beside one another.

16. A mobile terminal comprising:

a terminal case having a front space and a rear space, the rear space having a first space and a second space disposed in a length direction;

first and second PCBs (Printed Circuit Boards) mounted in the first space, wherein the first and second PCBs are mounted to be partially overlapping each other;

a battery disposed to face the first and second PCBs and mounted in the second space;

keypads electrically connected to at least one of the first and second PCBs and mounted on at least two of four sides of the terminal case;

a touch screen installed to a front surface of the terminal;

a display module mounted in the front space, and located over the battery and the first and second PCBs and located under the touch screen and configured to display information; and front and rear covers enclosing the terminal case, wherein the keypads include a first keypad and a second keypad connected to at least one of the first and second PCBs, wherein the terminal case is disposed between the front and rear covers and between the display module and the battery and first and second PCBs and includes through holes to electrically connect the display module to at least one of the first and second PCBs, and wherein the first and second keypads are mounted on first and second sides of the terminal case, respectively, and a third keypad is mounted on the front surface of the terminal case.

\* \* \* \* \*